United States Patent
Fulton et al.

(10) Patent No.: US 10,113,476 B1
(45) Date of Patent: Oct. 30, 2018

(54) HYDRAULIC TURBOCHARGED ENGINE WITH AUTOMATIC START-STOP

(71) Applicant: Ford Global Technologies, LLC, Dearborn, MI (US)

(72) Inventors: Brien Lloyd Fulton, West Bloomfield, MI (US); Dave R. Hanna, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 6 days.

(21) Appl. No.: 15/498,323

(22) Filed: Apr. 26, 2017

(51) Int. Cl.
| | |
|---|---|
| F02B 37/10 | (2006.01) |
| B60T 17/02 | (2006.01) |
| B60W 30/18 | (2012.01) |
| F02B 37/18 | (2006.01) |
| F02D 23/00 | (2006.01) |

(52) U.S. Cl.
CPC .............. F02B 37/10 (2013.01); B60T 17/02 (2013.01); B60W 30/18018 (2013.01); B60W 30/18109 (2013.01); F02B 37/18 (2013.01); F02D 23/00 (2013.01); B60T 2270/88 (2013.01); B60W 2510/0633 (2013.01)

(58) Field of Classification Search
CPC .......... F02B 37/10; F02D 23/00; B60T 17/02; B60W 30/18018; B60W 30/18127
See application file for complete search history.

(56) References Cited

U.S. PATENT DOCUMENTS

| | | | |
|---|---|---|---|
| 3,751,912 A | 8/1973 | Bach | |
| 6,450,591 B1 | 9/2002 | Kawahata et al. | |
| 7,104,920 B2 * | 9/2006 | Beaty | B60K 6/48 477/5 |
| 7,146,266 B2 * | 12/2006 | Teslak | B60K 6/12 701/69 |
| 2012/0180480 A1 | 7/2012 | Kapich | |
| 2012/0180481 A1 * | 7/2012 | Kapich | F02B 37/10 60/606 |
| 2016/0304096 A1 * | 10/2016 | Khafagy | B60W 30/18109 |

OTHER PUBLICATIONS

"Hydraulic Start-Stop HSS From on-highway to off-highway," Rexroth Bosch Group Fact Sheet, Available Online at https://www.boschrexroth.com/en/us/products/systems-and-modules/mobile-hydraulic-systems/hydraulic-start-stop-hss/hss-customer-benefits/hss-customer-benefits-page/, Sep. 2014, 2 pages.

"Hydraulic Start-Stop System," Linde Hydraulics Website, Available Online at http://www.linde-hydraulics.com/en-gb/catalogue/detail.aspx?pid=56845&gid=43796&pg=W9S81%2f6lacZHTrdWfewh%2bA%3d%3d, Available as Early as Dec. 16, 2014, 3 pages.

* cited by examiner

*Primary Examiner* — John D Walters
*Assistant Examiner* — James J Triggs
(74) *Attorney, Agent, or Firm* — Julia Voutyras; McCoy Russell LLP (57) ABSTRACT

Methods and systems are provided for a vehicle engine including a turbocharger coupled to a hydraulic pump and hydraulic accumulator. In one example, a method may include, in response to the vehicle coming to a stop, supplying pressure to a hydraulic braking system of the vehicle from the accumulator coupled to a hydraulic pump coupled to a shaft of a turbocharger of an engine installed in the vehicle, and automatically shutting down the engine while the vehicle is stopped.

20 Claims, 6 Drawing Sheets

FIG. 5

HYDRAULIC TURBOCHARGED ENGINE WITH AUTOMATIC START-STOP

FIELD

The present description relates generally to methods and systems for a hydraulic brake system that allows the use of automatic engine start-stop technology on a hydraulic hybrid vehicle.

BACKGROUND/SUMMARY

With increasing emissions regulations, the demand for more fuel efficient vehicles has also increased. In order to increase fuel economy, the prevalence of technologies such as automatic start-stop systems are on the rise. These start-stop systems automatically shut down the engine when the vehicle is stopped and idling, a major source of fuel waste, by withholding fuel delivery to the combustion chambers. Prolonged idle conditions are typical for delivery vehicles, taxis, and commuters in heavy stop-and-go traffic. During temporary engine shut down, as soon as the vehicle controller receives a torque demand from the operator, or an indication of other engine parameters (e.g., low battery charge) necessitating engine power, the engine is restarted and resumes nominal operation. Automatic engine start-stop systems are present in many hybrid electric vehicles, where supplemental electric motors are utilized to run auxiliary systems when the engine is off. Many hybrid electric vehicles employ the use of an integrated starter-motor that replaces the conventional starter motor and alternator for the purpose of capturing regenerative braking energy and withstanding the frequent number of start-stop cycles inherent to these systems.

Hydraulic hybrid vehicles (HHV) may store pressurized fluid in a reservoir (e.g., accumulator) during engine operation. One example of hydraulic hybrid vehicle is shown by Teslak, et al. in U.S. Pat. No. 7,146,266. Therein, a reversible pump uses braking energy to direct hydraulic fluid into a nitrogen-filled high pressure accumulator. When a vehicle controller receives a torque demand from the operator, the pump is reversed and the pressurized fluid is used to accelerate the vehicle. The inventors, however, have recognized potential issues with such systems. In one example, the hydraulic brake systems associated with compression-ignition engines are typically supplied with hydraulic pressure from a primary engine source, such as the power steering system, which does not function when the engine is off. In order to maintain functionality of the brake system during an engine-off condition, these systems often include a supplemental electric pump motor.

Attempts to address integrating automatic start-stop systems into compression-ignition engine systems include what is known as a full hybrid, where a hydraulic pump-motor is coupled to the engine for starting and stopping both the vehicle and the engine. One example approach is shown by Beaty, et al. in U.S. Pat. No. 7,104,920. Therein, a hydraulic hybrid powertrain system includes an engine coupled to a hydraulic pump-motor, the hydraulic pump-motor coupled to a transmission of the vehicle and to a hydraulic accumulator. The transmission may be operated via the hydraulic pump-motor, or by both the engine and hydraulic pump-motor. The inventors, however, have recognized potential issues with such full hybrid systems. In one example, the systems above require the addition of a hydraulic pump-motor of significant size, which adds substantial cost, weight, and complexity to the vehicle system, making it impractical to implement on most passenger vehicles.

In one example, the issues described above may be addressed by a method for a vehicle, including: in response to the vehicle coming to a stop, supplying pressure to a hydraulic braking system of the vehicle from an accumulator coupled to a hydraulic pump coupled to a shaft of a turbocharger (e.g., hydraulic turbocharger) of an engine installed in the vehicle, and automatically shutting down the engine while the vehicle is stopped. In this way, the hydraulic pressure accumulator coupled to a hydraulic hybrid engine may be used as a brake energy source to enable to the use of automatic start-stop technology, thereby improving fuel economy and reducing emissions.

As one example, during engine operation, a hydraulic pump coupled to the rotating shaft of the turbocharger charges the accumulator (e.g., hydraulic accumulator) with hydraulic pressure when the pressure in the accumulator is less than a threshold. When the vehicle comes to a stop for more than a threshold duration, and the pressure in the accumulator is above a threshold, the brake fluid supplied to a brake assembly coupled to a wheel of the vehicle will transition from being sourced from a primary engine source to being sourced from a hydraulic accumulator. The hydraulic accumulator is capable of maintaining hydraulic pressure even when the engine is off, unlike typical hydraulic brake systems associated with compression-ignition engines, where the primary engine source loses power, and consequently hydraulic pressure, when the engine is shut off. As a result of being able to utilize the accumulator to supply pressurized hydraulic brake fluid to the brake system, automatic engine start-stop may be enabled for a compression-ignition engine. In this way, the use of an expensive pump-motor to maintain hydraulic pressure may be avoided, keeping manufacturing costs down and increasing fuel efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
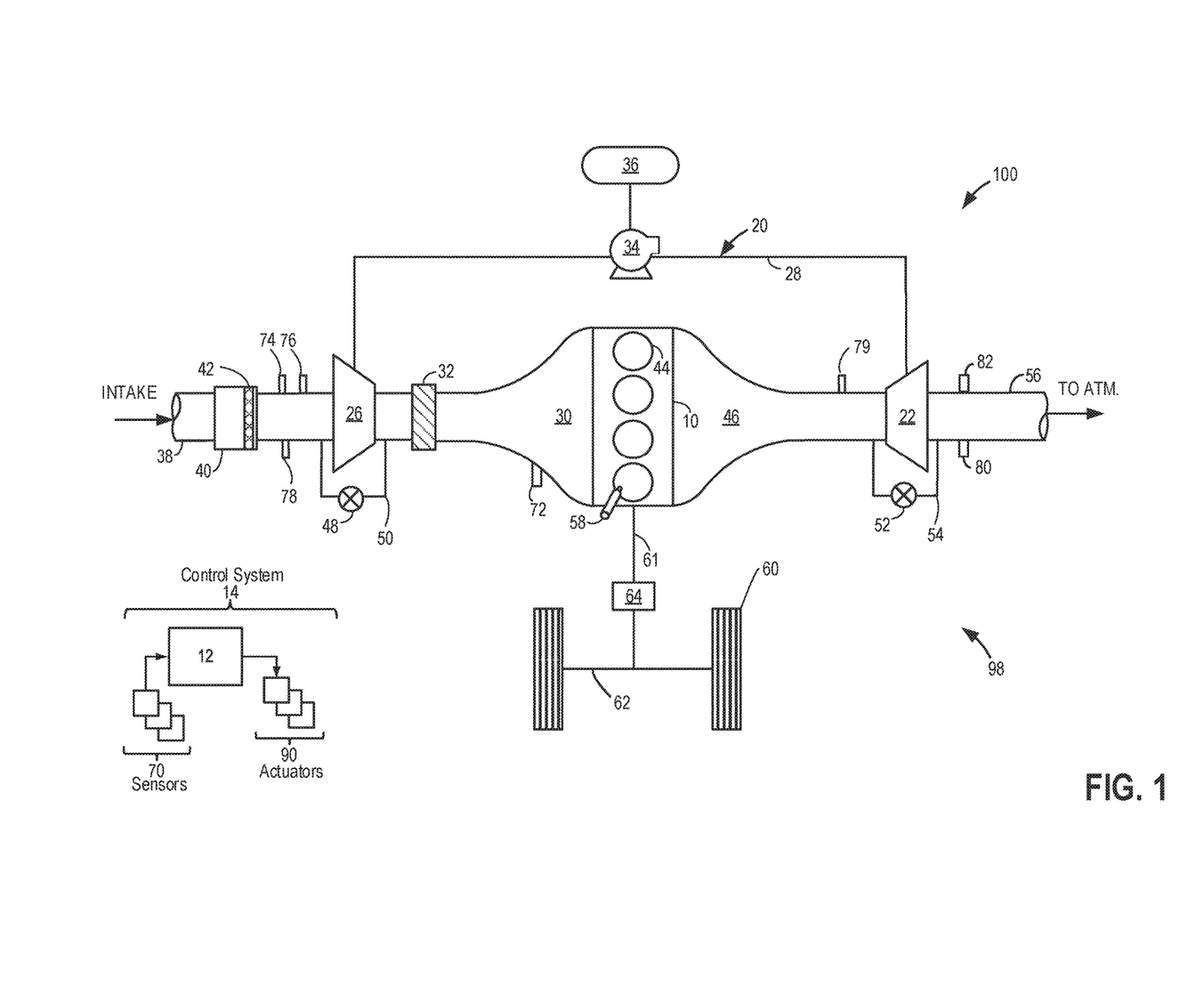
FIG. 1 shows an example embodiment of an engine system including a hydraulic turbocharger coupled to an engine.
Figure 2:
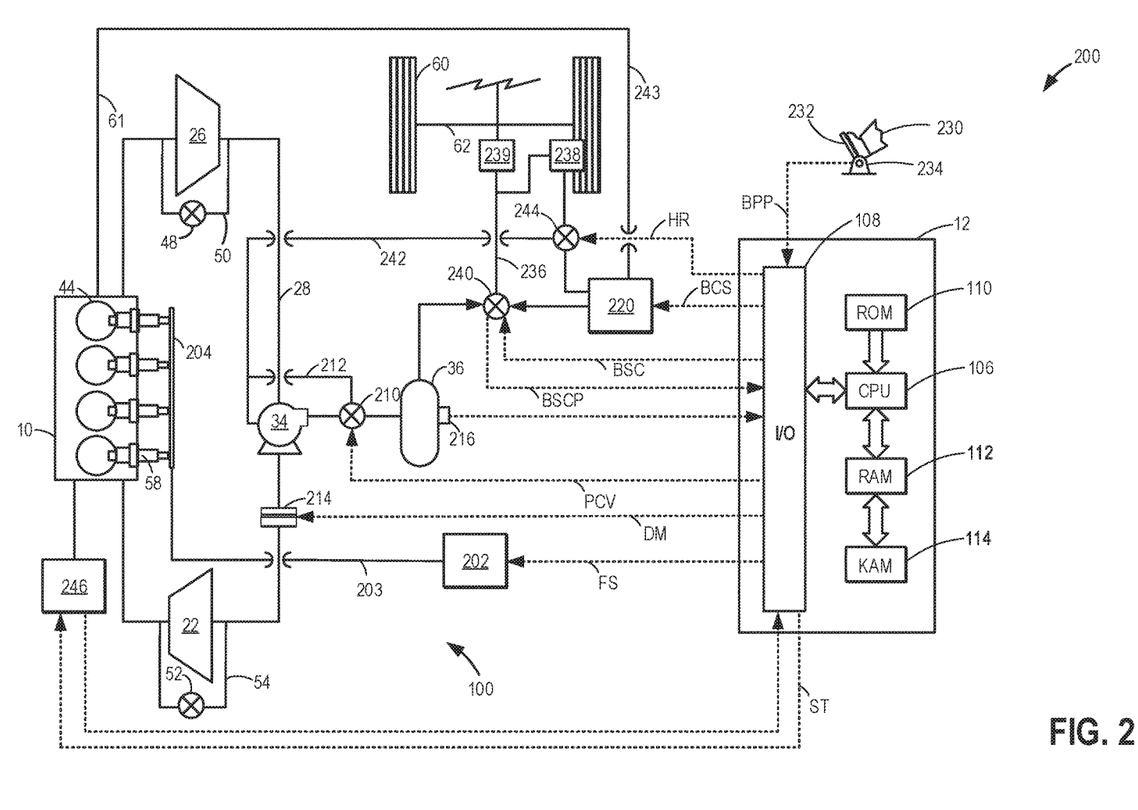
FIG. 2 shows an example embodiment of a hydraulic brake system coupled to an engine that includes a hydraulic turbocharger and hydraulic accumulator, the engine configured to automatically start and stop.

The following description relates to systems and methods for a hydraulic brake system that allows the use of automatic start-stop technology on a hydraulic hybrid vehicle. One example of such a system includes a turbocharged engine, where the turbocharger is coupled to a hydraulic pump and an accumulator, as shown in FIG. 1. Therein, the accumulator may also be coupled to the hydraulic brake system of the vehicle, and the hydraulic brake system may be configured to operate using hydraulic brake pressure from a primary engine source or from the hydraulic accumulator, as shown in FIG. 2. In one example, the engine may be a diesel (e.g., compression ignition) engine where the primary engine source may only supply hydraulic pressure to the hydraulic brake system when the engine is on and operating. Control of the hydraulic turbocharger during engine operation may be according to a controller routine, such as the example routine shown in FIGS. 3A-3B. The vehicle controller may be configured to perform a routine, such as the example routine of FIG. 4, responsive to a vehicle braking condition and a hydraulic pressure level of the accumulator, to enable automatic start-stop. An example operation of the turbocharged engine coupled to a hydraulic pump and an accumulator is shown in FIG. 5. By coupling a hydraulic braking system of a compression-ignition engine system to a hydraulic accumulator pressurized by a hydraulic pump coupled to a turbocharger, a ready supply of hydraulic pressure is available during engine-off conditions, enabling the use of automatic start-stop technology for a compression-ignition engine system.

FIG. 1 schematically shows aspects of an example engine system 100. Engine system 100 may be included in a propulsion system such as in an on-road vehicle system 98. In one example, the on-road vehicle system 98 is a hydraulic hybrid vehicle. Engine system 100 includes an engine 10, which may be a compression-ignition (e.g., diesel) engine. In other embodiments, engine 10 may be an internal combustion engine or other suitable type of engine. Engine 10 is coupled to a boosting device. In the depicted example, the boosting device is a hydraulic turbocharger 20 that comprises an exhaust-driven turbine 22 positioned in the exhaust passage 56 coupled to a compressor 26 via a shaft 28. Compressor 26 is positioned in the intake passage 38 upstream of a charge air cooler (e.g., CAC 32). Also coupled to turbocharger 20 is a hydraulic pump 34 so that hydraulic pump 34 may be driven by the turbocharger. In the depicted example, hydraulic pump 34 is shown coupled directly to a shaft 28, coupled directly to the turbine 22 and the compressor 26, but it will be appreciated that hydraulic pump may be coupled to a separate shaft, selectively driven by shaft 28. Hydraulic pump 34 may be hydraulically coupled to a hydraulic accumulator 36, so actuation of the hydraulic pump 34 may direct hydraulic energy to the hydraulic accumulator 36 (e.g., reservoir) for storage. Hydraulic pump 34 may also be fluidically coupled to a source of hydraulic brake fluid (e.g., sump) which is not shown in FIG. 1. The brake fluid source may be shared with a primary engine source, described further below with respect to FIG. 2, or may be separate and independent of the brake fluid source of the primary engine source. In one example, hydraulic accumulator 36 may be a bladder-type accumulator that includes a nitrogen gas-filled, elastic bladder fitted into a hard-walled pressure vessel. In another example, hydraulic accumulator 36 may be a piston-type accumulator that includes an actuated piston to compress and pressurize the incoming hydraulic fluid. In a further example, hydraulic accumulator 36 may be a diaphragm-type accumulator that includes a rubber plate (e.g., diaphragm) as the separating element between a nitrogen compartment and a hydraulic compartment.

In this way, the hydraulic accumulator 36 may be charged by operation of the turbocharger (e.g., via rotation of shaft 28). Although the current embodiment uses a hydraulic turbocharger it will be appreciated that other combinations and configurations of boosting devices may be possible. In one embodiment, the turbocharger may be a twin scroll device. In another embodiment, the turbocharger may be a variable geometry turbocharger (VGT), where turbine geometry is actively varied as a function of engine operating conditions. In yet another embodiment, engine system 100 may comprise a supercharger and a turbocharger. In embodiments that include a supercharger, compressor 26 may be at least partially driven by an electric machine and/or the engine 10.

Engine 10 receives air along intake air passage 38 via an air box 40 including air cleaner 42. The air is compressed by compressor 26 and conveyed though the CAC 32 to cool before entering the intake manifold 30 where it enters the engine 10. In some examples, the CAC 32 may be an air-to-air or water-to-air heat exchanger. In the embodiment shown in FIG. 1, the pressure of the air charge within the intake manifold 30 is sensed by a manifold air pressure (MAP) sensor 72.

One or more sensors may be coupled to an inlet of the compressor 26, as shown in FIG. 1. For example, a temperature sensor 74 may be coupled to the inlet for estimating a compressor inlet temperature. As another example, a pressure sensor 76 may be coupled to the inlet of the compressor for estimating a pressure of air charge entering the compressor. Still other sensors may include, for example, air-fuel ratio sensors, humidity sensors, etc. In other examples, one or more of the compressor inlet conditions (such as humidity, temperature, etc.) may be inferred based on engine operating conditions. The sensors may estimate a condition of the intake air received at the compressor inlet from the intake passage as well as the air charge recirculated from upstream of the CAC 32. One or more sensors may also be coupled to intake passage 38, upstream of compressor 26, for determining a composition and condition of air charge entering the compressor. These sensors may include, for example, a mass air flow (MAF) sensor 78.

Intake manifold 30 is coupled to a series of combustion chambers 44 through a series of intake valves (not shown). The combustion chambers are further coupled to exhaust manifold 46 via a series of exhaust valves (not shown). In the depicted embodiment, a single exhaust manifold 46 is shown. However, in other embodiments, the exhaust manifold may include a plurality of exhaust manifold sections. Configurations having a plurality of exhaust manifold sections may enable effluent from different combustion chambers to be directed to different locations in the engine system 100.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as specified for desired combustion and emissions-control performance. Additionally, a variable cam timing device (not shown) may be actuated to adjust the timing of the intake and exhaust valves (not shown) to a timing that provides decreased positive intake to exhaust valve overlap. That is to say, the intake and exhaust valves will be open for a shorter duration and will move away from being simultaneously open for a portion of the intake stroke.

In some examples, compressor 26 may include a compressor recirculation valve (CRV) 48 across compressor 26. The depicted example shows a recirculation passage 50 with CRV 48 for recirculating (warm) compressed air from the compressor outlet back to the compressor inlet. In some embodiments, the compressor recirculation system may alternatively, or additionally, include a recirculation passage for recirculating (cooled) compressed air from the compressor outlet, downstream of the charge air cooler to the compressor inlet or compressor bypass for dissipating compressed air to atmosphere. The CRV 48 may be a continuously variable valve wherein a position of the valve is continuously variable from a fully closed position to a fully open position. In some embodiments, compressor recirculation valve 48 may be normally partially open during boosted engine operation to provide some surge margin. Herein, the partially open position may be a default valve position. Increasing the opening of the compressor recirculation valve may include actuating (or energizing) a solenoid of the valve. Further discussion of example CRV operation will be discussed herein.

Exhaust from the one or more exhaust manifold sections is directed to turbine 22 to drive the turbine. When reduced turbine torque is desired, some exhaust may be directed instead through a wastegate passage 54, bypassing the turbine 22. Wastegate valve 52 may be actuated open to dump at least some exhaust pressure from upstream of the turbine 22 to a location downstream of the turbine via wastegate passage 54. By reducing exhaust pressure upstream of the turbine 22, turbine speed can be reduced. In one embodiment, wastegate valve 52 may be vacuum actuated, that is, it may be actuated via the application of vacuum from the engine or other source. The combined flow from the turbine 22 and the wastegate passage 54 then flows through emission control (not shown) before all or part of the treated exhaust may be released into the atmosphere via exhaust passage 56. Depending on operating conditions, however, some exhaust may be diverted instead to the intake passage via an EGR passage (not shown) including an EGR cooler and an EGR valve. In one example, EGR may be recirculated to the inlet of compressor 26. Various sensors, including an exhaust temperature sensor 80 and exhaust pressure sensor 82, may be included in exhaust passage 56. In some examples, an oxygen sensor 79 may be coupled to the exhaust manifold 46 for estimating the proportion of oxygen in the exhaust gas.

The depicted embodiment includes a compression-ignition engine that may operate using diesel or biodiesel. Diesel engines typically operate using direct injection, which includes injecting fuel directly into the combustion chamber. It will be appreciated, however, that other fuels may be used, such as gasoline, alcohol fuel blends, compressed natural gas, etc. Engines that utilize these fuels may supply fuel to the combustion chambers via direct injection, port injection, throttle valve-body injection, or any combination thereof. Port injection delivers the fuel spray into the intake ports where it mixes with the intake air before entering the combustion chamber. The present example may include a plurality of direct fuel injectors 58. As previously mentioned, the depicted embodiment is a compression-ignition engine an as a result combustion may be initiated via compression ignition, but it will be appreciated that in alternate embodiments, spark ignition may also be used. Additionally, example embodiments that comprise a spark ignition engine may also include a throttle with a variably actuatable throttle plate (not shown).

During conditions when there is a transient increase in driver torque demand, such as during a tip-in, when going from engine operation without boost to engine operation with boost, the opening of the wastegate valve 52 may be decreased in order to restrict the wastegate passage 54, thereby reducing the amount of exhaust gas bypassing the turbine. By increasing the flow of exhaust gas through the turbine 22, the speed of the turbocharger increases, thereby increasing the amount of compressed intake air delivered to the combustion chambers of the engine. In one example, the wastegate valve 52 may be closed. The increased speed of the turbine may drive the compressor 26, thereby increasing the pressure of the intake air entering the engine 10. Additionally, the increased speed of the turbine 22 and thus the turbocharger shaft 28 may drive the speed of the hydraulic pump 34, thereby increasing the volume and/or pressure of hydraulic fluid (e.g., hydraulic energy) stored within (e.g., charging) the accumulator 36. Further details regarding hydraulic pump and accumulator control will be covered herein with reference to FIGS. 2-5.

During conditions when there is a decrease in driver torque demand, such as during a tip-out, when going from engine operation with boost to engine operation without boost, the CRV 48 may be opened so that the higher speed of the turbine 22 does not overwhelm the compressor 26 and cause compressor surge. In one example, if the accumulator pressure level is above a threshold pressure level, the wastegate valve 52 opening may be increased to increase the flow of exhaust gas bypassing the turbine 22 and reduce turbine speed. This allows excess boost pressure to be substantially immediately relieved. However, in another example, if the accumulator pressure level is below a threshold pressure level during a tip-out, the wastegate valve 52 may remain closed so that the turbine 22 may continue to spin, consequently spinning the hydraulic pump 34 to direct hydraulic fluid into the accumulator 36, thereby charging the accumulator. The opening of the CRV 48 may be increased to provide some surge margin. An example turbocharger operation is discussed further below in reference to FIGS. 3A-3B.

Engine torque from engine 10 may be transferred to vehicle wheels 60 via one or more powertrain shafts 62. A motor vehicle may have any number of wheels 60. Specifically, engine torque may be relayed from crankshaft 61 to a transmission 64, and thereon to the wheels 60 via one or more powertrain shafts 62. Transmission 64 may be a fixed ratio transmission including a plurality of gear ratios to allow engine 10 to rotate at a different speed than wheels 60. Transmission 64 may be automatic, wherein operating conditions determine transmission gear, or manual, wherein the operator selects transmission gear. A clutch (not shown) may be provided between engine crankshaft 61 and transmission 64. By changing a torque transfer capacity of the clutch (e.g., an amount of clutch slippage), an amount of engine torque relayed to the wheels via the powertrain shaft may be modulated.

Engine system 100 may further include control system 14. Control system 14 is shown receiving information from a plurality of sensors 70 (various examples of which are described herein) and sending control signals to a plurality of actuators 90 (various examples of which are described herein). As one example, sensors 70 may include MAP sensor 72, compressor inlet temperature sensor 74, MAF sensor 78, compressor inlet pressure sensor 76, exhaust temperature sensor 80, and exhaust pressure sensor 82. An engine speed signal, RPM, may be generated by controller 12 from a profile ignition pickup signal (PIP) from a Hall effect or other type sensor (not shown) coupled to crankshaft 61. Manifold air pressure signal MAP from manifold pressure sensor 72 may be used to provide an indication of vacuum, or pressure, in the intake manifold. Other sensors, such as additional pressure, temperature, air/fuel ratio, and composition sensors may be coupled to various locations in engine system 100. The actuators 90 may include, for example, compressor recirculation valve 48, wastegate valve 52, and fuel injector 58.

The control system 14 may further include the controller 12. The controller may receive input data from the various sensors 70, process the input data, and employ the various actuators 90 based on the received signals and instructions stored on a memory of the controller. The controller 12 may employ the actuators 90 in response to the processed input data based on instruction or code programmed therein corresponding to one or more routines, such as example control routines described herein with regard to FIGS. 3A, 3B, and 4. As one example, the controller may send a signal to an actuator of the wastegate valve 52 to increase or decrease the opening of the wastegate valve to accordingly decrease or increase the rotation speed of the exhaust turbine 22 and turbocharger shaft 28 driving the compressor 26 of the turbocharger 20.

Control system 14 may further include a display device (not shown) for enabling operator input (e.g., a keyboard, a touch screen) and conveying instructions and messages to the operator. In one example, the display device may be coupled to the controller. The controller may receive operator input via the display device, and/or an instruction set may be sent to the operator from the controller 12 via the display device. In one example, an operator may disable an engine's automatic start-stop function by indicating a request via the display device.

In addition to using the turbocharger 20 for providing a transient boost pressure, a hydraulic pump coupled to the turbocharger may be advantageously used to generate a source of hydraulic energy for temporary storage in the hydraulic accumulator 36. As a result, the hydraulic turbocharger 20 may provide a reliable, on-board source of hydraulic energy. In one example, the hydraulic energy may be stored in hydraulic accumulator 36, which offers a readily-available source of hydraulic energy that may be used to maintain brake pressure for a hydraulic brake system during an engine-off condition. As a result of having a reliable source of hydraulic energy during engine-off conditions, automatic start-stop of the engine may be enabled.

Turning now to FIG. 2, a more detailed schematic of the hydraulic brake system and automatic start-stop system of the engine system 100 introduced in FIG. 1 is shown. Controller 12, coupled to engine system 100, is shown as a microcomputer, including microprocessor unit 106, input/output ports 108, an electronic storage medium for executable programs and calibration values shown as read-only memory chip 110 in this particular example, random access memory 112, keep alive memory 114, and a data bus. Controller 12 may receive various signals from sensors coupled to engine 10, in addition to those signals previously discussed with reference to FIG. 1, including, but not limited to, measurement of inducted mass air flow (MAF) from mass air flow sensor 78, manifold absolute pressure signal (MAP) from sensor 72, and accumulator pressure from pressure sensor 216. Controller 12 receives signals from the various sensors of FIGS. 1-2 and employs the various actuators of FIGS. 1-2 to adjust engine operation based on the received signals and instructions stored on a memory of the controller. In one example, controller 12 may receive a signal from pressure sensor 216 indicating the internal pressure of the hydraulic accumulator 36 is below a first pressure threshold and, in response, adjust operation of a pump control valve 210 to direct hydraulic fluid from hydraulic pump 34 into the accumulator.

Engine 10 may be coupled to an engine starting system 246, including a starter motor. In one example, the starter motor may be coupled to an energy storage system (e.g., a battery), wherein the starter motor is driven by energy from the battery. In another example, the starter motor may be a crank integrated starter generator (CISG). In yet another example, the starter motor may be a belt-driven integrated starter generator (BISG). In still another example, the starter may be a powertrain drive motor, such as a hybrid powerplant connected to the engine by way of a coupling device. The coupling device may include a transmission, one or more gears, and/or any other suitable coupling device. The starter may be configured to support engine restart at or below a predetermined near zero threshold speed (e.g., below 50 or 100 rpm) as indicated by a signal (ST) from the controller 12. In other words, by operating the starter motor of starting system 246, the engine 10 may be spun and cranked.

Engine 10 is shown with four cylinders 44, but it will be appreciated that engine 10 may include more or less cylinders. One fuel injector 58 is shown coupled to each cylinder 44, but it will be appreciated that more than one fuel injector may be coupled to each cylinder. Fuel from fuel system 202 may be conveyed to the engine 10 via fuel line 203 and distributed to fuel injectors 58 via a fuel rail 204. Compression-ignition engine fuel rail injection (e.g., common rail direct injection) systems are actively controlled to ensure optimal fuel combustion and distribution. In one example, fuel rail 204 may operate at an increased pressure to increase fuel atomization. In other examples, the controller 12 may send a signal to inject a small amount of fuel to the combustion chambers (e.g., cylinders 44) prior to the main injection event to lower engine noise. It will be appreciated that specific fuel rail 204 configurations, fuel injection timing, and fuel injection quantities may vary to meet design engine constraints and desired performance parameters.

Fuel system 202 may include one or more of a tank (e.g., fuel tank), a fuel pump, and a control valve (not shown) to store and manage fuel supply. As mentioned previously, the depicted example is a compression-ignition engine, and so the fuel system may operate using diesel or biodiesel, although in other engine configurations, other fuels may be used. One or more fuel pumps and one or more fuel control valves of fuel system 202 may be controllably actuated to adjust the amount of fuel delivered to the fuel injectors 58 of engine 10. In some examples, a fuel control valve may be an electromechanically-actuated solenoid valve. In the depicted example fuel system 202 is actively controlled, responsive to a fuel signal (FS) from controller 12. In one example, responsive to receiving a first FS signal, fuel system 202 may be controlled to decrease fuel delivery to engine 10 by decreasing the opening of the fuel control valve or by decreasing operation of the fuel pump. In another example, responsive to a second FS signal, fuel system 202 may be controlled to increase fuel delivery to combustion chambers 440 of engine 10 by increasing the opening of the fuel control valve or by increasing operation of the fuel pump. It will be appreciated that fuel injectors 58 may also be actively controlled to regulate fuel to the cylinders, including during automatic engine start-stop events.

As described in FIG. 1, turbine 22 is coupled to compressor 26 via turbocharger shaft 28. In one example, hydraulic pump 34 may be coupled to turbocharger shaft 28. In other examples, hydraulic pump 34 may be on a distinct shaft, separate from shaft 28, but may nevertheless be driven by the spinning of shaft 28. Additionally, hydraulic pump 34 may be configured to decouple from turbocharger shaft 28. Hydraulic pump 34 is fluidically coupled to hydraulic accumulator 36. In the depicted embodiment, the hydraulic pump may be driven by the spinning turbocharger, the hydraulic pump directing pressurized hydraulic fluid into the accumulator 36. Under some conditions, the accumulator 36 may reach a first pressure threshold (e.g., maximum pressure) when no additional hydraulic pressure is desired in the accumulator. In one example, the first pressure threshold may be determined based upon accumulator manufacturer recommendations or design limitations of hydraulic brake system components. In other examples, the first pressure threshold may be determined based upon the probable usage of stored hydraulic pressure so that the increased cost associated with storing an excessive amount of pressurized hydraulic fluid may be avoided.

Some embodiments of the hydraulic system may include a pump control valve 210 coupled between the hydraulic pump 34 and the hydraulic accumulator 36. In the event that the hydraulic pressure stored in the accumulator 36 has reached the first pressure threshold, as indicated by the accumulator pressure sensor 216, the pump control valve 210 may be actuated to control the destination of hydraulic fluid leaving the hydraulic pump 34. Controller 12 may send a control signal (PCV) to actuate the pump control valve 210. In one example, pump control valve 210 may be actuated to a first position, responsive to the accumulator pressure being below a first pressure threshold as indicated by accumulator pressure sensor 216. Therein, hydraulic fluid from the outlet of the hydraulic pump 34 may be directed to the accumulator 36, thereby charging the accumulator 36. In another example, the pump control valve 210 may be actuated to a second position, responsive to the accumulator pressure being above a first pressure threshold as indicated by accumulator pressure sensor 216. Therein, hydraulic fluid from the outlet of the hydraulic pump 34 may be directed through a recirculation passage 212 to the inlet of the hydraulic pump 34 or to a hydraulic oil sump (not shown) as discussed previously. In some examples, optionally or additionally to being adjusted responsive the accumulator pressure, pump control valve 210 may be adjusted responsive to engine operating parameters such as turbocharger speed or operator torque demand.

In some examples, hydraulic pump 34 may be configured to decouple from the turbocharger 20. Therein, a decoupling mechanism 214 or other suitable means may be coupled between the hydraulic pump and the turbocharger shaft. In one example, decoupling mechanism 214 may be a clutch. In some embodiments, controller 12 may send a control signal (DM) to actuate the decoupling mechanism 214. The decoupling mechanism 214 may be actuated to a first position, responsive to the accumulator pressure being below a first pressure threshold as indicated by accumulator pressure sensor 216. Therein, the decoupling mechanism 214 couples the hydraulic pump 34 to the turbocharger 20 so that the hydraulic pump 34 is driven by the spinning of the turbocharger 20, thereby directing hydraulic fluid to the accumulator 36 (e.g., charging the accumulator). The decoupling mechanism 214 may also be actuated to a second position, responsive to the accumulator pressure being at or above a first pressure threshold as indicated by accumulator pressure sensor 216. Therein, the hydraulic pump 34 is decoupled from the turbocharger 20, so that the hydraulic pump 34 is not driven by the turbocharger 20, thereby decreasing (e.g., stopping) hydraulic fluid from being directed from the hydraulic pump 34 to the accumulator 36. It will be appreciated that additional signals or engine operating parameters may contribute to the determination of whether hydraulic pump is decoupled from the turbocharger.

In other examples, hydraulic pump 34 may be configured to decouple from the accumulator 36. In one example, hydraulic pump 34 may be decoupled from the accumulator by actuating a pump control valve 210 to direct hydraulic fluid though a recirculation passage 212 rather than entering the accumulator 36. In some examples, recirculated hydraulic fluid may re-enter an oil sump, from which the hydraulic pump draws, or enter the hydraulic pump inlet. Another possible method of decoupling the hydraulic pump from the accumulator includes running the hydraulic pump in stall.

It will be appreciated that some embodiments may include one or more of a mechanism for decoupling the hydraulic pump 34 from the turbocharger 20, and a mechanism for decoupling the hydraulic pump 34 from the accumulator 36. Other embodiments may include another suitable method of maintaining operation of the turbocharger without directing hydraulic fluid from the hydraulic pump into the accumulator when it is not desirable to do so. It will be appreciated that additionally or optionally, the hydraulic pump 34 may also be decoupled from compressor 26.

In some embodiments, when the hydraulic pressure stored in the accumulator 36 is at or above a first pressure threshold, and there is a boost demand from the operator above a first boost demand threshold, hydraulic fluid (e.g., energy) may be directed from the accumulator 36 to the hydraulic pump 34 to assist spin up of the turbocharger. In this way, the likelihood of turbo lag occurrence may be reduced. In some embodiments, conveyance of hydraulic fluid from the accumulator 36 to the turbocharger for boost assist may be accomplished by sending a PCV signal to actuate the pump control valve 210 so that hydraulic fluid may pass from the accumulator 36, through the recirculation passage 212, and return to upstream of the hydraulic pump or to an oil sump upstream of the hydraulic pump in order to drive the hydraulic pump, thereby also driving the turbocharger. In alternate embodiments, a separate recirculation passage may be implemented to direct hydraulic fluid from the accumulator 36 to the turbocharger for assisting with boost. In further embodiments, it may be possible to reverse the pump in order to provide boost torque to the turbocharger 20. It will be appreciated that hydraulic pressure stored in the accumulator 36 may also be advantageously used to power other vehicle systems, including the alternator or driveshaft, for example. In some examples, hydraulic accumulator 36 may also be coupled to a power take-off (PTO) 239 that may or may not be coupled to a vehicle driveshaft, such as powertrain shaft 62. In this way, hydraulic energy from the accumulator 36 may be used to actuate PTO 239 to power a wide range of auxiliary components. Some non-limiting examples of PTO-powered auxiliary units include air compressors, generators, liquid transfer pumps, pneumatic blowers, and vacuum pumps (not shown).

Vehicle wheel 60 is nominally equipped with a brake assembly 238 that may include brake calipers. In the depicted example, the brake system is a hydraulic brake system, which includes a primary engine source 220 of hydraulic brake energy (e.g., pressurized hydraulic brake fluid, brake fluid, hydraulic fluid), although it will be appreciated that other styles of brake systems may be used. In some examples, primary engine source 220 may be a power steering system. In this way, the hydraulic fluid of the power steering system may also serve as the primary engine source 220 that supplies hydraulic fluid to the brake system. In one example of a hydraulic brake system, when the operator 230 depresses a brake pedal 232, a pushrod (not shown) actuates a piston in a reservoir (e.g., master cylinder) causing brake fluid to flow through a port into a chamber. This increases the pressure in the hydraulic system, forcing fluid through hydraulic brake lines 236, where the hydraulic fluid actuates the brake system to apply a braking force to the wheels 60 (e.g., via actuation of brake calipers).

Other examples of hydraulic brake systems include brake-by-wire, which is typical on modern hybrid vehicles. In brake-by-wire, the hydraulic force generated when the operator 230 depresses the brake pedal 232 is measured by brake pedal position sensor 234, and signal BPP is sent to the controller 12. Additional sensor input may be used to determine the appropriate brake control signal (BCS) to send to the primary engine source 220. In some examples, additional sensor input may include wheel speed sensors, yaw sensor, steering wheel angle, and accelerator position. Based on sensor input, as may be indicated by actuation of a brake pedal, the operator's request to stop the vehicle is received by the controller 12. As a result, the controller generates a BCS signal which may actuate a pump (not shown) coupled to the primary engine source 220 to pressurize the hydraulic system and actuate a brake assembly 238 coupled to wheel 60 to apply a suitable braking force to the wheel 60. In one example, actuation of brake assembly 238 may include actuation of brake calipers. It will be appreciated that brake assemblies are typically installed on all vehicle wheels, but for simplicity, only one wheel and the brake assembly components coupled to it are labeled in FIG. 2.

Brake-by-wire systems may supplement primary braking systems, or may be a standalone brake system. In one example, a vehicle operator 230 may desire to bring the vehicle to an abrupt stop at a red light and depresses the brake pedal 232 quickly and completely. The complete depression of the brake pedal 232 is sensed by brake pedal position sensor 234, indicating a BPP signal to the controller 12 that a high braking force has been requested by the operator. In response to the BPP signal, and perhaps a signal from a vehicle speed sensor, the controller may send a brake control signal (BCS) to the primary engine source 220 to actuate the brake system to apply an immediate and high braking force to the wheels to stop the vehicle as requested by the operator.

In the depicted example, the hydraulic system may be configured to operate using hydraulic fluid (e.g., energy) from primary engine source 220 and/or the hydraulic accumulator 36. In one example, a brake source control (BSC) valve 240 may be coupled to the hydraulic brake system such that brake assembly 238 may be fluidically coupled, via hydraulic brake lines 236, to the primary engine source 220 or the accumulator 36. In this way, actuation of the brake source control valve 240 may dictate whether brake assembly 238 receives brake fluid from the primary engine source 220 or from the accumulator 36. It will be appreciated that in some embodiments, hydraulic fluid may also be supplied to the primary engine source 220 from the hydraulic accumulator 36 during automatic engine stops. In this way, if primary engine source 220 is a power steering system, hydraulic fluid from the hydraulic accumulator may also provide power steering during an automatic engine stop. Brake source control valve 240 may be actuated based on a brake source control valve signal (BSC) generated by the controller. In one example, BSC valve 240 may be actuated to a first position by a first BSC signal, where the first position of BSC valve directs hydraulic fluid from the primary engine source 220 to supply the brake assembly 238. In another example, BSC valve 240 may be actuated to a second position by a second BCS signal, wherein actuating the BSC valve 240 to the second position stops the flow of hydraulic fluid from the primary engine source 220 and begins directing hydraulic fluid from the hydraulic accumulator 36 to the brake assembly 238. In one example, the BSC signal may be determined based on feedback from various engine sensors, including a vehicle speed sensor, the accumulator pressure sensor 216, and the brake control signal, which, at least in part, is based on the brake pedal position sensor. Additionally, the position of the brake source control valve 240 may be indicated to the controller 12 by signal BSCP coupled to BSC valve 240.

Brake assembly 238 may include a hydraulic return line 242 that provides a conduit for returning hydraulic brake fluid to the hydraulic brake system when a braking force is no longer being requested. In some examples, the hydraulic accumulator and the primary engine source may have a common oil source (e.g., sump) wherein all hydraulic fluid from the hydraulic return line enters a shared sump. Alternately, the hydraulic accumulator and the primary engine source may be independent hydraulic systems with separate and distinct return lines and oil sumps. For a common sump configuration, a return control valve 244 may be actuated to dictate the destination of returning hydraulic fluid. In some examples, the return control valve 244 may be controlled based upon a hydraulic return (HR) signal from the controller, HR signal responsive to pressure levels in the primary engine source 220 and in the accumulator 36. For example, if the hydraulic pressure in the primary engine source 220 drops below a predetermined threshold pressure, return control valve 224 may be actuated to a first position to direct returning hydraulic fluid to the primary engine source 220, thereby increasing the pressure in the primary engine source 220. Alternately in the same example, if the hydraulic pressure in the accumulator 36 drops below a predetermined threshold pressure, return control valve 224 may be actuated to a second position to direct returning hydraulic fluid to the accumulator 36.

Under typical operating conditions (e.g., when the vehicle is being propelled and/or when the engine is operating), the primary engine source 220 may be used to supply hydraulic fluid to brake assembly 238. In some examples, primary engine source 220 may be coupled to engine crankshaft 61, and the primary engine source 220 may be powered by the motion of the crankshaft 61. In some embodiments, the primary engine source 220 may be coupled to the crankshaft 61 via a coupling mechanism 243 (e.g., a timing belt or timing chain). However, when the engine is off, the crankshaft 61 does not continue to spin, and the primary engine source will not continue to be powered by the motion of the crankshaft 61. As a result, the primary engine source 220 may not be available to supply pressurized hydraulic fluid to the brake assembly 238 when the engine is off. By configuring the brake system to operate using the accumulator 36 as an additional source of pressurized hydraulic brake fluid, a readily-available source of pressurized hydraulic brake fluid is available during engine-off conditions. As a result, a vehicle equipped with the aforementioned systems may also be configured to operate using automatic start-stop technology, thereby increasing fuel economy without the addition of expensive supplemental electrical motors.

Figure 3A:
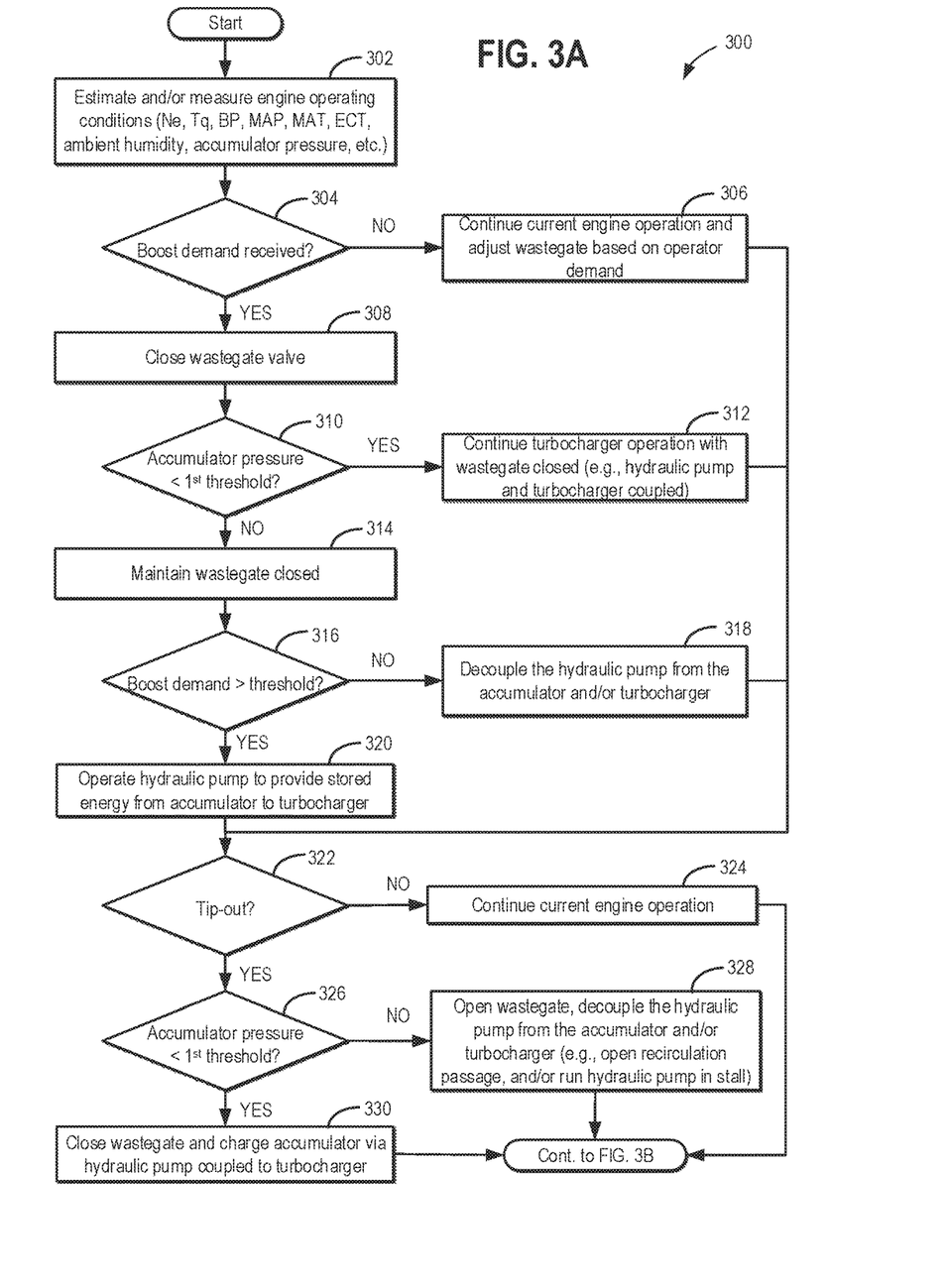
FIGS. 3A-3B show a flowchart illustrating a routine that may be implemented to operate a turbocharger to fill a hydraulic accumulator and operate a hydraulic brake system coupled to the hydraulic accumulator.

Turning now to FIG. 3A, an example routine 300 for operating a turbocharger coupled to a hydraulic pump is shown. Therein, the hydraulic pump is also coupled to a hydraulic accumulator, and configured to charge the accumulator with hydraulic fluid under suitable operating conditions. Instructions for carrying out routine 300 and the rest of the routines and methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 302, the routine includes estimating and/or measuring engine operating conditions for an engine such as the turbocharged engine shown in FIGS. 1 and 2. Engine operating conditions may include, but are not limited to, engine speed (Ne), desired engine torque (Tq), brake pedal position (BPP), manifold absolute pressure (MAP), manifold air temperature (MAT), engine coolant temperature (ECT), ambient humidity, the pressure in the accumulator (e.g., accumulator 36 shown in FIGS. 1 and 2). At 304, it is determined whether a demand for boost has been received (e.g., a boost level over the currently provided boost level or a demanded boost pressure over atmospheric pressure). In one example, the operator may have actuated an accelerator pedal indicating an increased demand for boost. If no boost demand is received, then at 306, the routine includes continuing current engine operation and adjusting a wastegate valve (e.g., wastegate valve 52 of FIGS. 1 and 2) based on operator demand before continuing to monitor for a tip-out condition at 322. In one example, no boost demand may include a coasting condition where the vehicle may be propelled down a hill without necessitating boost. Therein, the wastegate valve may remain closed as indicated according to mapped data for the given operating condition. It will be appreciated that, in one embodiment, unless instructed by a controller (e.g., controller 12 of FIGS. 1 and 2), a hydraulic pump (e.g., hydraulic pump 34 of FIGS. 1 and 2) and a turbocharger (e.g., turbocharger 20 of FIGS. 1 and 2) of the engine may be coupled to one another.

If a boost demand is received, then at 308 the controller sends a signal to an actuator coupled to the wastegate valve to decrease the opening of (e.g., close) the wastegate valve. To meet the boost demand, the wastegate valve may be fully closed so as to prevent exhaust gas from bypassing the turbine. The increased flow of exhaust gas through the turbine increases the speed of the turbine, thereby also increasing the speed of the hydraulic pump and the compressor coupled to the turbine. By increasing the speed of the compressor, intake air is compressed and delivered to the engine, increasing its boost capability.

At 310, the routine includes determining whether the pressure in a hydraulic accumulator (e.g., hydraulic accumulator 36 of FIGS. 1 and 2) is less than a first pressure threshold. In one example, the first threshold may be the maximum desired hydraulic pressure storable in the accumulator. The first pressure threshold may be determined based upon accumulator manufacturer recommendations, or may be based upon the allowable pressure of hydraulic lines coupled to the hydraulic brake system. If the accumulator pressure is less than the first pressure threshold, then at 312, the routine includes continuing turbocharger operation with the wastegate valve closed before monitoring for a tip-out condition at 322. It will be appreciated that the hydraulic pump and turbocharger continue to be coupled, and the spinning of the turbine will cause the hydraulic pump to charge the accumulator with pressurized hydraulic fluid. It will be appreciated that charging the hydraulic accumulator indicates that hydraulic fluid is entering the hydraulic accumulator, thereby increasing the pressure exerted on the hydraulic fluid by the compression mechanism inside the accumulator. As previously mentioned, the compression mechanism may be a pre-charge of inert, compressible gas (e.g., nitrogen) inside the accumulator, or it may be an actuated piston. As a result, the amount of stored hydraulic energy (e.g., in the form of pressurized hydraulic fluid) in the accumulator is also increased.

If the accumulator pressure is greater than the first threshold, then the routine continues to 314 where the routine includes maintaining the wastegate closed. The routine then continues to 316 to determine whether the boost demand is greater than a threshold boost demand.

If the accumulator pressure is greater than the first pressure threshold, but the boost demand is not greater than the threshold boost demand, then at 318, the routine may include decoupling the hydraulic pump from the accumulator or turbocharger. A boost demand less than the threshold boost demand may occur when the boost demand isn't sufficient to justify using boost assist from the accumulator. For example, if the boost demand is not greater than the threshold, then this may indicate that the turbocharger is spinning fast enough for the current boost demand and additional rotational energy from the accumulator is not needed to achieve the desired boost level (e.g., boost demand as determined based on an operator demanded torque level). In one example, decoupling the hydraulic pump may include decoupling the hydraulic pump from the turbocharger. Decoupling the hydraulic pump from the turbocharger may include actuation of a decoupling mechanism (e.g., decoupling mechanism 214 of FIG. 2). In another example, the hydraulic pump may be decoupled from the accumulator. Decoupling the hydraulic pump from the accumulator may include actuating a pump control valve (e.g., pump control valve 210 of FIGS. 1 and 2). Actuation of the pump control valve may allow hydraulic fluid from the pump to be recirculated from downstream of the hydraulic pump to upstream of the hydraulic pump, rather than continuing to the hydraulic accumulator. In other examples, the hydraulic pump may run in stall mode in order to prevent excessive pressure from entering the accumulator.

If the boost demand is greater than the threshold boost at 316, this may indicate a higher boost demand, such as from a tip-in. The boost demand over the threshold boost level at 316 may be greater than the initial boost demand received at 304. In one example, the threshold boost level at 316 may be based on a current speed of the turbocharger. For example, if the boost demand is greater than the threshold, the turbocharger may not be able to increase fast enough to provide the demanded boost. Thus, if the boost demand is greater than the threshold, the routine continues to 320. At 320, the routine includes advantageously providing stored energy from the accumulator to the turbocharger to meet the increased boost demand. In one example, hydraulic fluid from the accumulator may be directed to the hydraulic pump in order to increase the speed of the pump. Because the hydraulic pump and the turbine may be coupled via one or more shafts (e.g., shaft 28 of FIGS. 1 and 2), increasing the speed of the hydraulic pump may also increase the speed of the turbocharger and increase boost delivered to the engine. In another example, the hydraulic pump may be reversed in order to provide stored energy from the accumulator to the turbocharger. In this way, stored hydraulic energy may be used to provide engine boost and reduce the likelihood of turbo lag.

At 322, it is determined whether a tip-out condition exists. A tip-out condition occurs when the operator removes actuation of the accelerator pedal (e.g., removes their foot from the accelerator pedal), causing a relatively sharp decrease in torque demand. In one example, a tip-out may occur when the operator commands the vehicle to an abrupt stop in response to approaching an obstruction in the road. If a tip-out condition has not occurred (e.g., the controller receives a pedal position signal greater than a threshold from a pedal position sensor of the accelerator pedal), then the routine continues to 324, where the routine includes continuing current engine operation before continuing to step 332 shown in FIG. 3B. Continuing current engine operation may include continuing to deliver stored energy from the accumulator to the turbocharger to meet boost demand.

If a tip-out condition has occurred, then the routine continues to 326, where the routine determines whether the accumulator pressure is less than the first pressure threshold. As previously mentioned, the first pressure threshold of the accumulator is the pressure when no additional hydraulic pressure is desired in the accumulator (e.g., a maximum pressure or storage level of the accumulator). In one example, the first pressure threshold may be determined based upon accumulator manufacturer recommendations or design limitations of hydraulic brake system components. In other examples, the first pressure threshold may be determined based upon the probable usage of stored hydraulic pressure so that the increased cost associated with storing an excessive amount of pressurized hydraulic fluid may be avoided. If the accumulator pressure is greater than the first pressure threshold, then the routine continues to 328, where the routine may include one or more of opening the wastegate, decoupling the hydraulic pump from the turbocharger, and decoupling the hydraulic pump from the hydraulic accumulator, as previously described. In one example, opening the wastegate valve may include the controller sending a signal to the actuator of the wastegate valve to increase the opening of the valve in order to increase the amount of exhaust gas bypassing the turbine. In another example, decoupling the hydraulic pump and turbocharger may include the controller sending a signal to the actuator of the decoupling mechanism (e.g., clutch) to decouple the hydraulic pump and turbocharger. In a further example, decoupling the hydraulic pump from the hydraulic accumulator may include opening a pump control valve to recirculate the hydraulic fluid leaving the hydraulic pump rather than directing it to the accumulator. In other examples, the pump may be operated in stall mode. In some examples, engine operating parameters, such as turbocharger speed or the accumulator pressure level, may determine how the hydraulic pump may be decoupled from the accumulator using one or more of the methods described above. In this way, the continuing operation of the turbocharger will not overcharge the accumulator.

If the accumulator pressure is less than the first pressure threshold, then the routine continues to 330, where the routine includes closing the wastegate valve coupled to a wastegate passage (e.g., wastegate passage 54 of FIGS. 1 and 2) coupled across the exhaust turbine. As a result of closing the wastegate valve, exhaust gas may not bypass the turbine. Instead, exhaust gas travels through the turbine, spinning the turbine, and thus spinning the hydraulic pump coupled to the turbine. By maintaining the wastegate closed during a tip-out condition, the hydraulic pump may continue to spin during a tip-out condition, thereby opportunistically charging the accumulator.

Figure 3B:
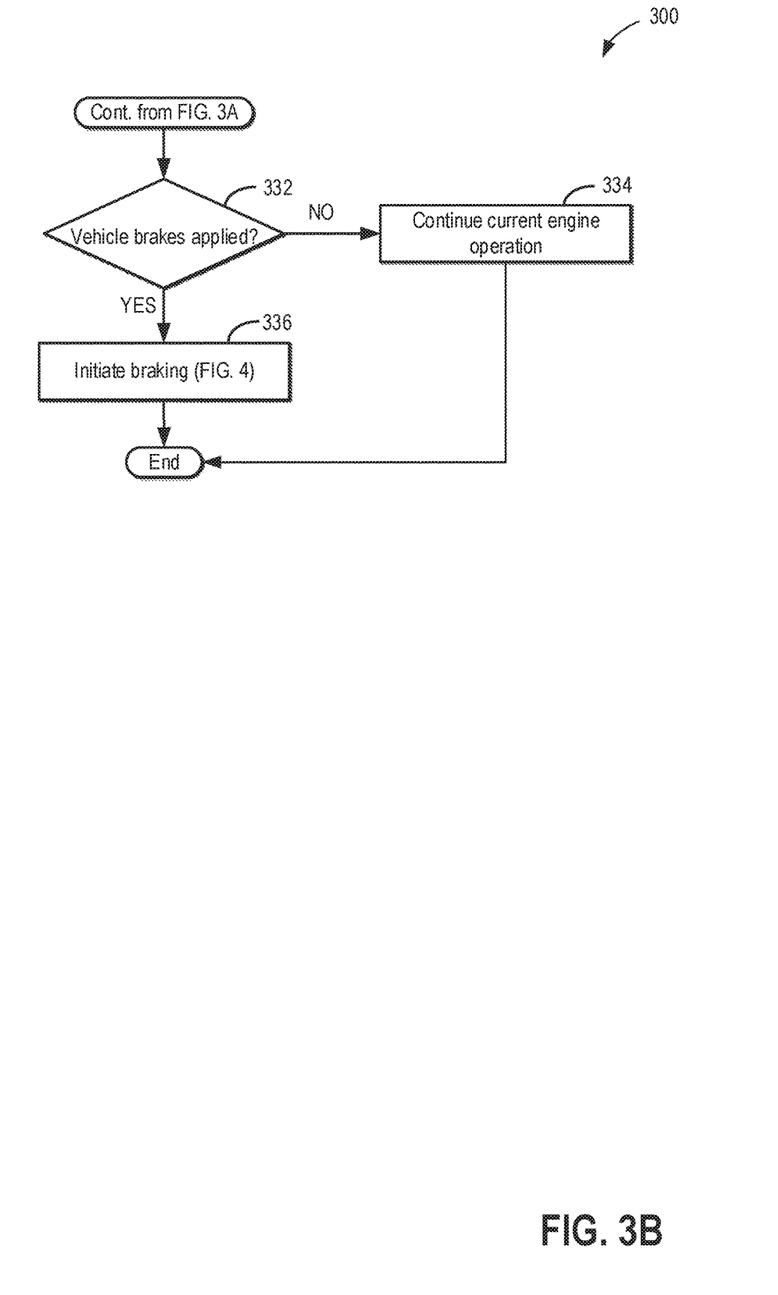

After 330, the routine proceeds to 332 shown in FIG. 3B, where it is assessed whether vehicle brakes are being applied. Applying the brakes may include the vehicle operator actuating a brake pedal (e.g., brake pedal 232 of FIG. 2) to indicate a desire to slow the vehicle. If vehicle brakes are not applied, then the routine continues to 334, where the routine includes continuing current engine operation before ending the routine.

Figure 4:
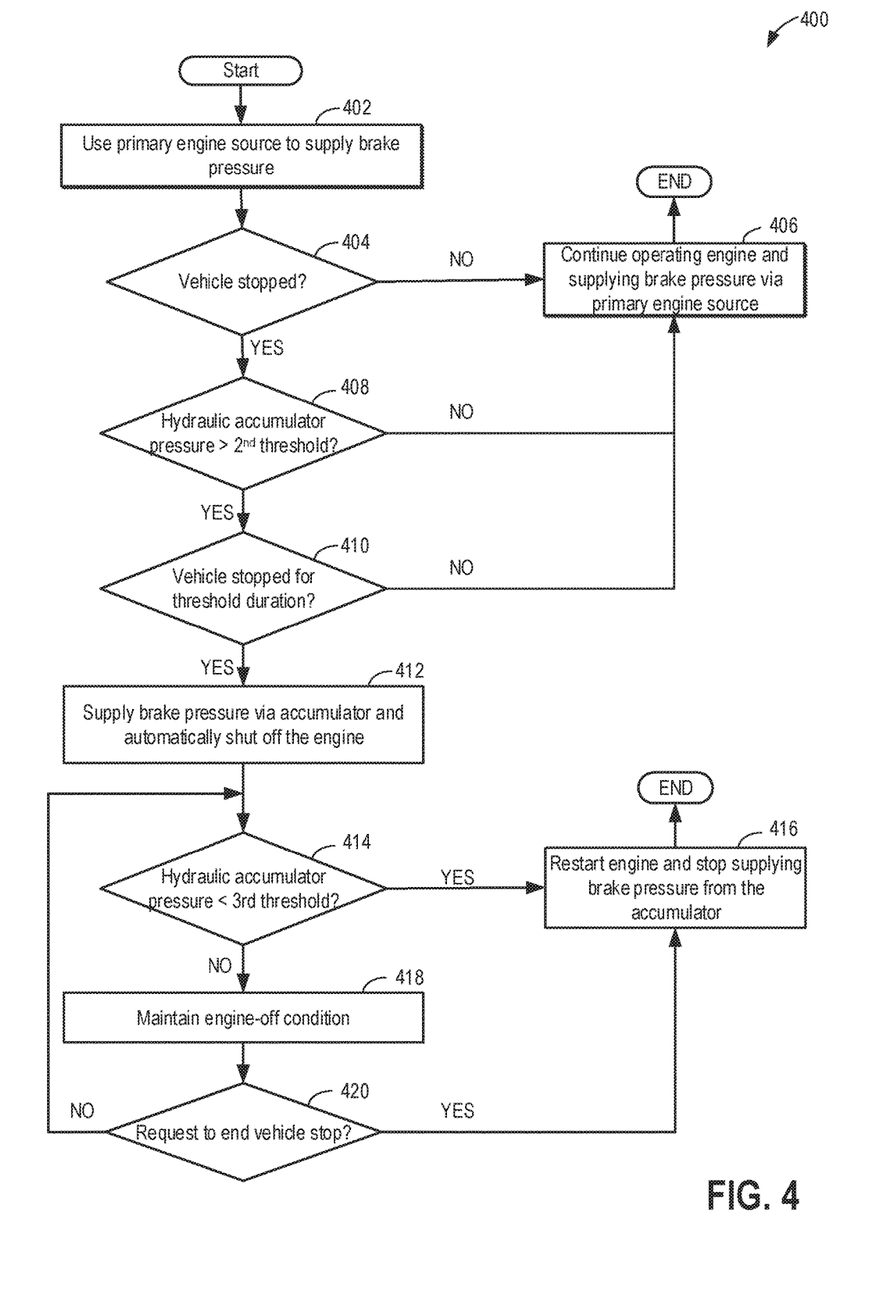
FIG. 4 shows a flowchart illustrating a routine that may enable automatic start-stop of a diesel engine with a hydraulic brake system.
Figure 5:
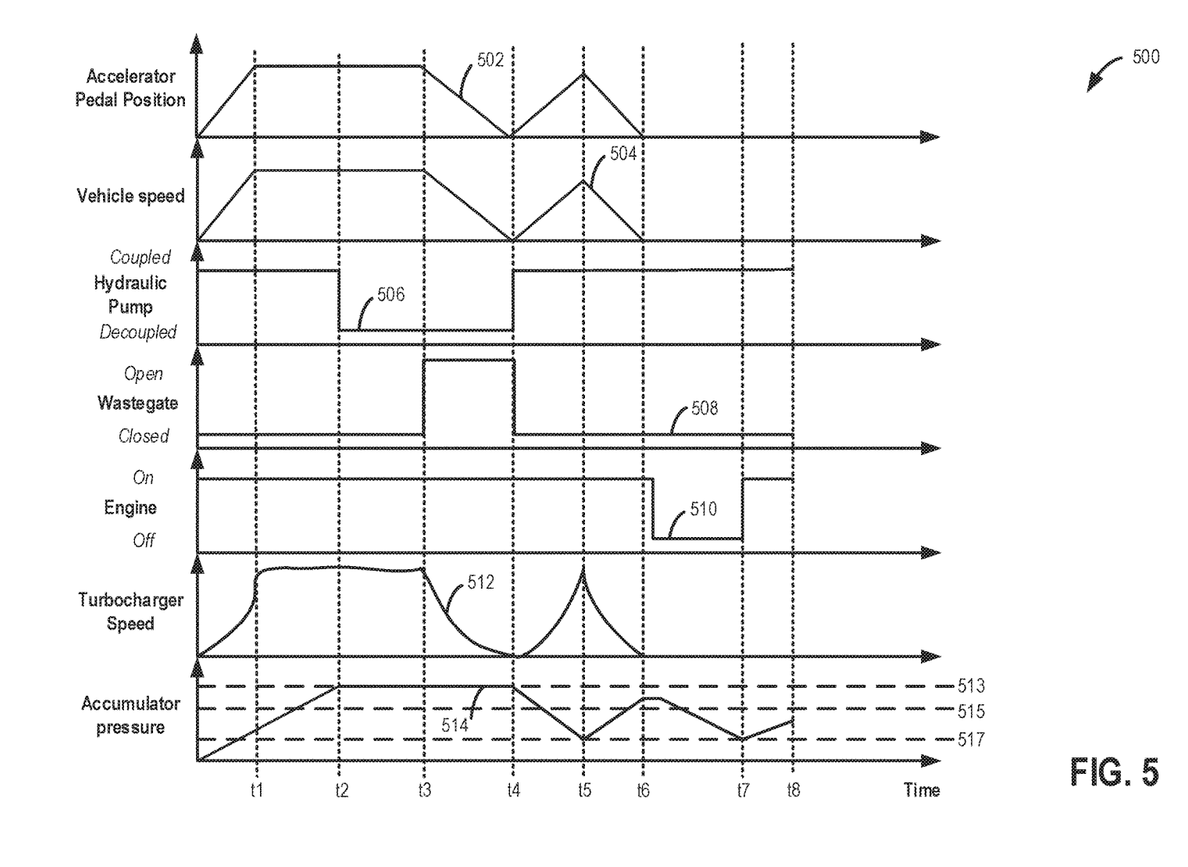
FIG. 5 shows an example operation of a turbocharged engine coupled to a hydraulic brake system including a hydraulic accumulator.

If vehicle brakes are applied, then the routine continues to 336, where the routine includes initiating braking, described further in FIG. 4, before ending the routine. Turning now to FIG. 4, a routine 400 that may enable automatic start-stop of a diesel engine with a hydraulic brake system is shown. Routine 400 may continue from 336 of routine 300, as shown in FIG. 3B. At 402, the routine includes, in response to the vehicle brakes being applied (while the engine is operating), using a primary engine source to supply brake pressure to the brake system. As a result of actuating the brake pedal, a brake pedal position (BPP) signal may be delivered to the controller and a brake control signal (BCS) may be indicated based upon parameters such as vehicle speed and the BPP signal, for example. A primary engine source (e.g., primary engine source 220 shown in FIG. 2) may receive the BCS signal from the vehicle controller to determine the amount of braking force (e.g., hydraulic fluid) to direct to a brake assembly coupled to a wheel (e.g., brake assembly 238 coupled to wheel 60 shown in FIG. 2) of the vehicle, thereby slowing the vehicle.

At 404, the routine includes determining whether the vehicle is stopped (e.g., no longer being propelled). In one example, when approaching a red traffic light, a vehicle operator may actuate the brake pedal in order to apply vehicle brakes to bring the vehicle to a stop at the red traffic light. If the vehicle is not stopped, then the routine continues to 406 where the routine includes continuing to operate the engine and supply brake pressure via the primary engine source before ending. If it is determined that the vehicle is stopped at 404, then the routine continues to 408 to determine whether the pressure in the hydraulic accumulator is greater than a second pressure threshold. In one example, the second pressure threshold may be the hydraulic pressure level that is sufficient to enable automatic stop of the vehicle engine (e.g., engine 10 of FIGS. 1 and 2). In some examples, the second pressure threshold may be determined based upon the estimated hydraulic pressure necessary to maintain brake pressure for the duration of an average automatic engine stop event. In other examples, the second pressure threshold may be determined based upon mapped data.

If the hydraulic pressure stored in the accumulator is not greater than the second pressure threshold, then the routine continues to 406, where the routine includes continuing to operate the engine according to operator torque demand and supplying brake pressure via the primary engine source before ending. If the hydraulic pressure stored in the accumulator is greater than the second pressure threshold, then the routine continues to 410, where the routine includes determining whether the vehicle has been stopped for a threshold duration. If the vehicle has not been stopped for a threshold duration, then the routine continues to 406, where the routine includes continuing to operate the engine according to operator torque demand and supplying brake pressure via the primary engine source before ending. By ensuring that a threshold duration has elapsed before changing the source of hydraulic brake fluid and enabling automatic start-stop of the engine, this may help to avoid frequent stopping and starting of an engine when an operator may have the tendency to "pump" the brakes or "creep" the vehicle slowly during certain operating conditions, resulting in unnecessary wear on the engine and inconvenience to the operator. In one example, the threshold duration may be a set duration, such as two to three seconds.

In other examples, the controller may be able to recognize driving patterns to "learn" the traffic conditions surrounding the vehicle. In one example, if the controller recognizes the vehicle driving slowly with frequent, very short stops, the controller may compare this data with mapped data and assert that the vehicle is caught in stop-and-go traffic, and that the short duration of the vehicle stops may not be suitable for transitioning between brake sources and enabling automatic start-stop. Alternatively, if the controller recognizes a vehicle traveling at a relatively constant 35 mph, interspersed with stops of 20 or more seconds, the controller may compare this data with mapped data and assert that the vehicle may be traveling through a town with typical traffic lights, and the duration of the vehicle stops may be appropriate for transitioning between brake sources and enabling automatic start-stop. In other examples, GPS or vehicle-to-everything (V2X) capabilities may remotely assess driving conditions to determine whether traffic and other driving conditions are suitable for transitioning between brake sources enabling automatic start-stop. In this way, a controller may predict future conditions that may be suitable for automatic start-stop of the engine, responsive to an indication of deceleration and/or braking as well as inferences about traffic conditions and/or driving patterns. In one example, responsive to predicting an upcoming automatic start-stop condition, the controller may actuate a wastegate valve and/or a decoupling mechanism in order to increase the available pressure in the accumulator so that the potential duration of an impending start-stop may be increased, thereby further improving fuel economy.

In one example, the controller may send a brake control signal (BCS) to actuate a brake source control valve (e.g., brake source control valve 240 of FIG. 2) to selectively transition between sources of the hydraulic fluid supplied to the brake assembly. In one example, the brake source control valve may be actuated to a first position, wherein the primary engine source is fluidically coupled to the brake assembly and the hydraulic accumulator is not. Therein, hydraulic fluid may be conveyed from the primary engine source to the brake assembly. In another example, the brake source control valve may be actuated to a second position, thereby transitioning the source of hydraulic brake fluid from the primary engine source to the hydraulic accumulator. Specifically, the hydraulic accumulator (e.g., accumulator 36 of FIGS. 1 and 2) may be fluidically coupled to the brake assembly while the primary engine source is not. Therein, hydraulic fluid may be conveyed from the hydraulic accumulator to the brake assembly. If the vehicle has been stopped for a threshold duration, then at 412, the routine includes supplying brake pressure via the hydraulic accumulator and automatically shutting off the engine. In one example, supplying brake pressure via the hydraulic accumulator may be achieved by actuating the brake source control valve to the second position, wherein the hydraulic accumulator is fluidically coupled to the brake assembly and the primary engine source is not.

In some examples, the controller may also send a signal to actuate a power steering control valve (not shown) to selectively transition between sources of the hydraulic fluid supplied to the power steering system, which may also serve as the primary engine source (e.g., primary engine source 220 of FIG. 2). In one example, the brake source control valve may operate as a power steering control valve. The power steering control valve may be actuated to a first position, wherein the power steering system in not fluidically coupled to the hydraulic accumulator. Therein, hydraulic fluid may be conveyed only from the power steering system to provide power steering. In another example, the power steering control valve may be actuated to a second position, thereby transitioning the source of hydraulic fluid from the power steering system to the hydraulic accumulator. Specifically, the hydraulic accumulator (e.g., accumulator 36 of FIGS. 1 and 2) may be fluidically coupled to the power steering system and hydraulic fluid may be conveyed from the hydraulic accumulator to provide power steering. It will be appreciated that if the hydraulic accumulator is used to provide hydraulic power to both the hydraulic brake system and the power steering system during an automatic start-stop, that supplying power to the brake system may take priority over supplying power to the power steering system. Specifically, if the hydraulic accumulator has a reduced hydraulic charge, the brake system may be provided with hydraulic fluid prior to the power steering system being provided with hydraulic fluid. Likewise, if both the systems are being powered via the hydraulic accumulator and the accumulator charge level falls below a third pressure threshold, the engine may be started in order to maintain brake pressure. As a result of brake pressure being supplied to the brake assembly from the hydraulic accumulator, automatic start-stop of the engine may be enabled. Because the pressure in the hydraulic accumulator is not dependent on a running engine, the pressurized hydraulic brake fluid in the accumulator remains available for maintaining suitable brake pressure during an engine off condition. Automatically shutting off the engine may include stopping fueling of the engine. In one example, the controller may send a signal the fuel injectors (e.g., fuel injectors 58 of FIG. 2) coupled to the combustion chambers (e.g., combustion chambers 44 of FIGS. 1 and 2) to stop delivering fuel to the combustion chambers. In another example, the controller may send a signal to the fuel system of the engine (e.g., fuel system 202 of FIG. 2) to stop fuel delivery to the fuel injectors of the engine. Specifically, the controller may command the opening of a fuel control valve to decrease (e.g., close) or the fuel pump to stop pumping fuel to the engine. By preventing fuel from entering the combustion chambers of the engine, the engine will be automatically shut off. In other examples, the controller may stop delivery of fuel to the combustion chambers using other suitable means.

At 414, the routine includes determining whether the hydraulic accumulator pressure is less than a third pressure threshold. The third pressure threshold is smaller than the second pressure threshold. The third pressure threshold may be the minimum hydraulic pressure within the accumulator capable of supplying sufficient brake pressure to the brake assembly. In one example, the third pressure threshold may be based upon the minimum hydraulic brake pressure to hold the vehicle brakes, which may include a threshold margin. In other examples, the third pressure threshold may be based upon mapped data, or determined to avoid drawing a vacuum in the brake system. If the hydraulic accumulator pressure is less than the third pressure threshold, then at 416, the routine includes restarting the engine, and also includes stopping the supply of hydraulic brake pressure to the brake assembly from the hydraulic accumulator. At this time, hydraulic brake pressure to the brake assembly returns to the condition where hydraulic brake pressure is supplied by the primary engine source. In one example, switching the hydraulic brake source from the accumulator to the primary engine source may include the controller sending a BSC signal to actuate the brake source control valve to the first position, wherein the primary engine source is fluidically coupled to the brake assembly and the hydraulic accumulator is not. Therein, hydraulic fluid may be conveyed from the primary engine source to the brake assembly. Additionally at 416, the routine includes restarting the engine which may include the controller sending a signal to starter motor coupled to the engine to crank (e.g., spin) the engine. Restarting the engine may also include sending a control signal to the engine fuel system in order to reintroduce fuel, via fuel injectors, to combustion chambers of the engine. As a result of cranking the engine and reintroducing fuel to the combustion chambers, combustion resumes and the engine restarts. It will be appreciated that this restart is responsive to accumulator pressure relative to a threshold, not an operator request for torque or other auxiliary systems.

It will be appreciated that, in some embodiments, battery charge may also be monitored during automatic engine-off conditions, and restarting the engine may also be initiated if the battery charge drops below a threshold charge level. The threshold charge level may be determined based upon maintaining suitable charge to maintain vehicle operating systems, including the starter motor, as well as vehicle auxiliary systems.

If the hydraulic accumulator pressure is greater than the third pressure threshold, then at 418, the routine includes maintaining the engine-off condition. Maintaining the engine-off condition may include continuing to withhold fuel delivery from the combustion chambers of the engine. In addition, maintaining the engine-off condition may include continuing to utilize hydraulic brake pressure from the accumulator to actuate the brake assembly and keep the vehicle from being propelled.

At 420, the routine includes determining whether a request to end the vehicle stop condition has been received. In one example, the red traffic light that caused the operator to stop the vehicle has turned green, and the operator has indicated a desire to propel the vehicle. Therein, the operator may have actuated an accelerator pedal, or engaged the clutch to shift the vehicle transmission (e.g., transmission 64 of FIGS. 1 and 2) into gear indicating intent to propel the vehicle. If a request to end the vehicle stop condition has been received, then the routine proceeds to 416, where the engine is restarted, and the control stops supplying hydraulic brake pressure to the brake system via the hydraulic accumulator. Specifically, the primary engine source supplies brake pressure to the brake assembly.

Turning now to FIG. 5, an example operation of a turbocharged engine coupled to a hydraulic brake system including a hydraulic accumulator (such as the engine system shown in FIGS. 1-2) is shown at example map 500. The horizontal (x-axis) denotes time and the vertical markers t1-t8 identify significant times for turbocharger operation. In reference to FIG. 5, plot 502 shows variation in an accelerator pedal position over time. Plot 504 shows variation in vehicle speed over time. Plot 506 shows the coupling condition (e.g., coupled to the turbocharger and/or accumulator) of the hydraulic pump. Plot 508 shows changes in the position of a wastegate valve coupled across an exhaust turbine of a turbocharger. Plot 510 shows the engine on/off condition. Plot 512 shows the speed of the turbocharger with hydraulic pump coupled to the engine. Plot 514 shows the change in accumulator internal pressure over time relative to a first pressure threshold (plot 513), a second pressure threshold (plot 515), and a third pressure threshold (plot 517).

Prior to time t1, a tip-in, such as one that may occur when accelerating on an on-ramp to join high speed traffic, is indicated by accelerator pedal position (plot 502). Consequently, the vehicle speed increases as shown by plot 504. Because the accumulator pressure is below first pressure threshold 513, the hydraulic pump is coupled to the turbocharger and the hydraulic accumulator so rotation of the turbocharger may also rotate the hydraulic pump, thereby charging the accumulator (e.g., increasing the pressure inside the hydraulic accumulator), as shown by plot 514. The wastegate valve remains closed, as indicated by plot 508, and the engine is on because the vehicle is being propelled (plot 510). Turbocharger speed sees an increase as a result of the tip-in, as shown by plot 512.

At time t1, the accelerator pedal finds a steady position indicating a request for a steady and elevated speed, as shown by plot 502. The vehicle speed follows a similar trajectory (plot 504). The hydraulic pump remains coupled with the turbocharger and the hydraulic accumulator (plot 506) as the accumulator pressure remains below the first pressure threshold 513 prior to time t2, as shown by plot 514. The wastegate across the exhaust turbine remains closed (plot 508) to direct exhaust gas through the turbine. The engine remains on as shown by plot 510, as the vehicle is being propelled. After time t1, turbocharger speed stabilizes, as shown by plot 512.

The engine operating conditions remain largely unchanged at time t2, except that the pressure in the accumulator reaches the first pressure threshold 513, as shown by plot 514. As shown by plot 506, the hydraulic pump may be decoupled from the turbocharger and/or the hydraulic accumulator, as previously described, to avoid overcharging the accumulator. After time t2, the pressure in the hydraulic accumulator remains constant as it is no longer being charged by the hydraulic pump.

At time t3, a tip-out occurs, as shown by plot 502. The vehicle speed decreases accordingly, as shown by plot 504. Because the accumulator pressure is still at the first pressure threshold 513, as shown by plot 514, the hydraulic pump and the turbocharger may continue to be decoupled as shown by plot 506. In addition, the wastegate may be opened to avoid compressor surge, as shown by plot 508. Speed of the turbocharger decreases, as the rate of exhaust flow through the turbine also decreases. It will be appreciated that vehicle brakes (not shown) may be applied between t3 and t4 in order to bring the vehicle to a stop.

At time t4, the vehicle is no longer being propelled (e.g., the vehicle stops) but then is immediately propelled again, as shown by plot 504, in response to an operator torque request (e.g., tip-in), as shown by plot 502. The duration of the stop at t4 may not have exceeded a threshold duration, therefore the brake fluid source would not have been transitioned from the primary engine source to the hydraulic accumulator, and automatic stopping of the engine would not have been enabled or initiated. As a result, the engine remains on, as shown by plot 510. At t4, the accumulator pressure is at the first pressure threshold (plot 513) and in order to meet the increased torque demand, the accumulator may be used to provide additional boost to the engine. As a result, the hydraulic pump is again coupled to both the turbocharger and the accumulator (plot 506) in order to direct hydraulic fluid to the accumulator to the turbocharger. As a result, the accumulator pressure may decrease as shown by plot 514. The wastegate remains closed (plot 508) during the tip-in at t4.

The tip-in continues until time t5, when there is a tip-out, as shown by plot 502. During the tip-out, because the accumulator pressure is blow the first pressure threshold 513, the hydraulic pump and the turbocharger remain coupled (plot 506) and the wastegate remains closed (plot 508) so that operation of the turbocharger may continue to spin the hydraulic pump, thereby recharging the accumulator, as shown by plot 514. It will be appreciated that in order to bring the vehicle to a stop between t5 and t6, the operator may have also applied the brakes (not shown).

At time t6, the vehicle again comes to a stop as shown by vehicle speed plot 504 and remains stopped until t8. The accumulator pressure is above a second pressure threshold 515, as shown by plot 514, and because the vehicle also remains stopped for a duration that exceeds the threshold duration, the hydraulic brake source may be transitioned from the primary engine source to the hydraulic accumulator and automatic stop of the engine may be enabled and initiated. The engine may be automatically turned off after a threshold duration has elapsed after t6 as shown by plot 510. The wastegate remains closed, as shown by plot 508; the accelerator pedal (plot 502) remains zero between t6 and t8 as the vehicle is stopped. The hydraulic pump may be coupled with the turbocharger and the accumulator (plot 506).

Between t6 and t7, the vehicle remains stopped with the engine automatically shut off shortly after t6, and the accumulator may lose pressure (plot 514) as it is supplying hydraulic pressure to a brake assembly of the vehicle. At t7, the accumulator pressure drops to a third pressure threshold 517, as shown by plot 514. In response to the accumulator pressure reaching the third pressure threshold, the engine is restarted at t7 and remains on until t8, as shown by plot 510. The source of hydraulic brake pressure for the brake assembly may be transitioned from the hydraulic accumulator to the primary engine source at time t7.

In this way, a hydraulic turbocharger may be advantageously used to generate a source of hydraulic energy for temporary storage in an accumulator. As a result, the hydraulic turbocharger may provide a reliable, on-board source of hydraulic energy. In one example, the hydraulic energy may be stored in a hydraulic accumulator, which offers a readily-available source of hydraulic energy that may be used to maintain brake pressure for a hydraulic brake system during an engine-off condition. As explained above, diesel engines may employ a primary engine source to provide hydraulic brake pressure to the vehicle brakes; however, this primary source may not be available during an engine off condition. As a result of having a source of hydraulic energy during an engine-off condition, automatic start-stop may be enabled.

The technical effect of coupling a hydraulic pump to a turbocharger is that pressurized hydraulic fluid from the hydraulic pump may be stored for later use by a hydraulic brake system, including when the engine is off. The technical effect of providing a pressurized source of brake fluid during engine-off conditions is that the use of automatic start-stop technology on a vehicle equipped with hydraulic brakes is enabled. Specifically, the technical effect of, during a vehicle stop, supplying pressure to a hydraulic braking system of the vehicle from an accumulator coupled to a hydraulic pump coupled to a shaft of a turbocharger of an engine installed in the vehicle; and automatically shutting down the engine while the vehicle is stopped is enabling stopping of the engine (e.g., such as a diesel engine) while maintaining hydraulic brake pressure to the hydraulic pressure, thereby increasing fuel economy and reducing engine emissions.

A method for a vehicle includes, in response to the vehicle coming to a stop, supplying pressure to a hydraulic braking system of the vehicle from an accumulator coupled to a hydraulic pump coupled to a shaft of a turbocharger of an engine installed in the vehicle, and automatically shutting down the engine while the vehicle is stopped. In a first example of the method, the method further includes during engine operation when the vehicle is not stopped, supplying pressure to the hydraulic braking system from a primary engine source in response to a request to decrease a speed of the vehicle. A second example of the method optionally includes the first example and further includes wherein the automatically shutting down the engine is responsive to a pressure of the accumulator being above a threshold pressure level. A third example of the method optionally includes one or more of the first and second examples, and further includes wherein the automatically shutting down the engine is further responsive to the vehicle being stopped for a threshold duration. A fourth example of the method optionally includes one or more of the first through third examples, and further includes, not shutting down the engine while the vehicle is stopped in response to a pressure at the accumulator being below a threshold pressure level. A fifth example of the method optionally includes one or more of the first through fourth examples, and further includes, wherein supplying pressure to the hydraulic braking system from the accumulator includes actuating, via a controller, a valve to allow hydraulic pressure from the accumulator to travel to the hydraulic braking system. A sixth example of the method optionally includes one or more of the first through fifth examples, and further includes, during engine operation while the vehicle is in motion, adjusting a position of a wastegate valve disposed in a bypass passage around a turbine of the turbocharger based on a level of pressure stored at the accumulator. A seventh example of the method optionally includes one or more of the first through sixth examples, and further includes, wherein adjusting the wastegate valve includes opening the wastegate valve in response to the level of pressure stored at the accumulator being above an upper threshold level. An eighth example of the method optionally includes one or more of the first through seventh examples, and further includes, wherein adjusting the wastegate valve includes closing the wastegate valve in response to the level of pressure stored at the accumulator being below an upper threshold level and deceleration of the vehicle. A ninth example of the method optionally includes one or more of the first through eighth examples, and further includes, in response to a level of pressure stored at the accumulator reaching an upper threshold level, decoupling the hydraulic pump from the shaft of the turbocharger. A tenth example of the method optionally includes one or more of the first through ninth examples, and further includes, during engine operation while the vehicle is in motion, in response to a tip-in and a demanded boost level above a threshold level, driving the turbocharger via the hydraulic pump using hydraulic pressure stored at the accumulator. An eleventh example of the method optionally includes one or more of the first through tenth examples, and further includes, wherein the engine is a diesel engine.

Another method for a vehicle including a diesel engine, includes: during a first braking condition, supplying hydraulic pressure to a hydraulic braking system of the vehicle via a primary hydraulic pressure source of the diesel engine; and during a second braking condition, supplying hydraulic pressure to the hydraulic braking system of the vehicle via an accumulator coupled to a hydraulic pump coupled to a shaft of a turbocharger of the diesel engine. In a first example of the method, the method further includes, wherein the first braking condition includes when the diesel engine remains on while the vehicle brakes and comes to a stop and wherein the second braking condition includes when the diesel engine is automatically turned off in response to the vehicle braking and coming to a stop. A second example of the method optionally includes the first example and further includes wherein the second braking condition further includes when a level or pressure stored at the accumulator is above a threshold pressure level. A third example of the method optionally includes one or more of the first and second examples, and further includes adjusting a position of a wastegate valve disposed in a bypass passage around a turbine of the turbocharger based on a level of pressure stored at the accumulator. A fourth example of the method optionally includes one or more of the first through third examples, and further includes, further comprising initiating the first braking condition and not automatically stopping the engine in response to the vehicle coming to a stop and a level of pressure stored at the accumulator being below a threshold pressure level.

A vehicle system includes a diesel engine including a turbocharger and a hydraulic pump, the hydraulic pump coupled to each of a shaft of the turbocharger and an accumulator, the accumulator adapted to store hydraulic pressure generated via rotation of the hydraulic pump; a hydraulic brake system coupled to each of the accumulator and a primary hydraulic fluid source of the diesel engine; and a controller with computer readable instructions for: providing hydraulic brake pressure to the hydraulic brake system from the accumulator in response to a vehicle of the vehicle system being stopped for a duration; and automatically stopping the diesel engine. In a first example of the method, the method further includes, wherein the automatic stop of the engine is performed following providing the hydraulic brake pressure from the accumulator and responsive to a pressure in the accumulator being above a threshold pressure level. A second example of the method optionally includes the first example and further includes wherein the computer readable instructions further include instructions for providing hydraulic brake pressure to the hydraulic brake system from the primary hydraulic fluid source of the diesel engine in response to one or more of a pressure in the accumulator being below a threshold pressure level and the diesel engine continuing to operate during a braking condition.

In another representation, a method includes, adjusting a wastegate valve disposed in a bypass passage positioned around a turbine of a turbocharger of a diesel engine based on a boost demand and a pressure level stored at an accumulator coupled to a hydraulic pump coupled to a shaft of the turbocharger; and during an automatic engine start/stop operation while a vehicle in which the diesel engine is installed is stopped, supplying pressure to a hydraulic brake system of the vehicle from the accumulator.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
in response to the vehicle coming to a stop:
supplying pressure to a hydraulic braking system of the vehicle from an accumulator coupled to a hydraulic pump coupled to a shaft of a turbocharger of an engine installed in the vehicle; and
automatically shutting down the engine while the vehicle is stopped.

2. The method of claim 1, further comprising, during engine operation when the vehicle is not stopped, supplying pressure to the hydraulic braking system from a primary engine source in response to a request to decrease a speed of the vehicle.

3. The method of claim 1, wherein the automatically shutting down the engine is responsive to a pressure of the accumulator being above a threshold pressure level.

4. The method of claim 3, wherein the automatically shutting down the engine is further responsive to the vehicle being stopped for a threshold duration.

5. The method of claim 1, further comprising not shutting down the engine while the vehicle is stopped in response to a pressure of the accumulator being below a threshold pressure level.

6. The method of claim 1, wherein supplying pressure to the hydraulic braking system from the accumulator includes actuating, via a controller, a valve to allow hydraulic pressure from the accumulator to travel to the hydraulic braking system.

7. The method of claim 1, further comprising, during engine operation while the vehicle is in motion, adjusting a position of a wastegate valve disposed in a bypass passage around a turbine of the turbocharger based on a level of pressure stored at the accumulator.

8. The method of claim 7, wherein adjusting the position of the wastegate valve includes opening the wastegate valve in response to the level of pressure stored at the accumulator being above an upper threshold level.

9. The method of claim 7, wherein adjusting the position of the wastegate valve includes closing the wastegate valve in response to the level of pressure stored at the accumulator being below an upper threshold level and deceleration of the vehicle.

10. The method of claim 1, further comprising, in response to a level of pressure stored at the accumulator reaching an upper threshold level, decoupling the hydraulic pump from the shaft of the turbocharger.

11. The method of claim 1, further comprising, during engine operation while the vehicle is in motion, in response to a tip-in and a demanded boost level above a threshold level, driving the turbocharger via the hydraulic pump using hydraulic pressure stored at the accumulator.

12. The method of claim 1, wherein the engine is a diesel engine.

13. A method for a vehicle including a diesel engine, comprising:
   during a first braking condition, supplying hydraulic pressure to a hydraulic braking system of the vehicle via a primary hydraulic pressure source of the diesel engine; and
   during a second braking condition, supplying hydraulic pressure to the hydraulic braking system of the vehicle via an accumulator coupled to a hydraulic pump coupled to a shaft of a turbocharger of the diesel engine.

14. The method of claim 13, wherein the first braking condition includes when the diesel engine remains on while the vehicle brakes and comes to a stop and wherein the second braking condition includes when the diesel engine is automatically turned off in response to the vehicle braking and coming to a stop.

15. The method of claim 14, wherein the second braking condition further includes when a level of pressure stored at the accumulator is above a threshold pressure level.

16. The method of claim 14, further comprising adjusting a position of a wastegate valve disposed in a bypass passage around a turbine of the turbocharger based on a level of pressure stored at the accumulator.

17. The method of claim 13, further comprising initiating the first braking condition and not automatically stopping the engine in response to the vehicle coming to a stop and a level of pressure stored at the accumulator being below a threshold pressure level.

18. A vehicle system, comprising:
   a diesel engine including a turbocharger and a hydraulic pump, the hydraulic pump coupled to each of a shaft of the turbocharger and an accumulator, the accumulator adapted to store hydraulic pressure generated via rotation of the hydraulic pump;
   a hydraulic brake system coupled to each of the accumulator and a primary hydraulic fluid source of the diesel engine; and
   a controller with computer readable instructions for:
      providing hydraulic brake pressure to the hydraulic brake system from the accumulator in response to a vehicle of the vehicle system being stopped for a duration; and
      automatically stopping the diesel engine.

19. The vehicle system of claim 18, wherein the automatic stop of the diesel engine is performed following providing the hydraulic brake pressure from the accumulator and responsive to a pressure in the accumulator being above a threshold pressure level.

20. The vehicle system of claim 18, wherein the computer readable instructions further include instructions for providing hydraulic brake pressure to the hydraulic brake system from the primary hydraulic fluid source of the diesel engine in response to one or more of a pressure in the accumulator being below a threshold pressure level and the diesel engine continuing to operate during a braking condition.

* * * * *